June 5, 1923.
L. E. DOTY
RECOVERY OF AMMONIA
Filed Aug. 19, 1921
1,457,877
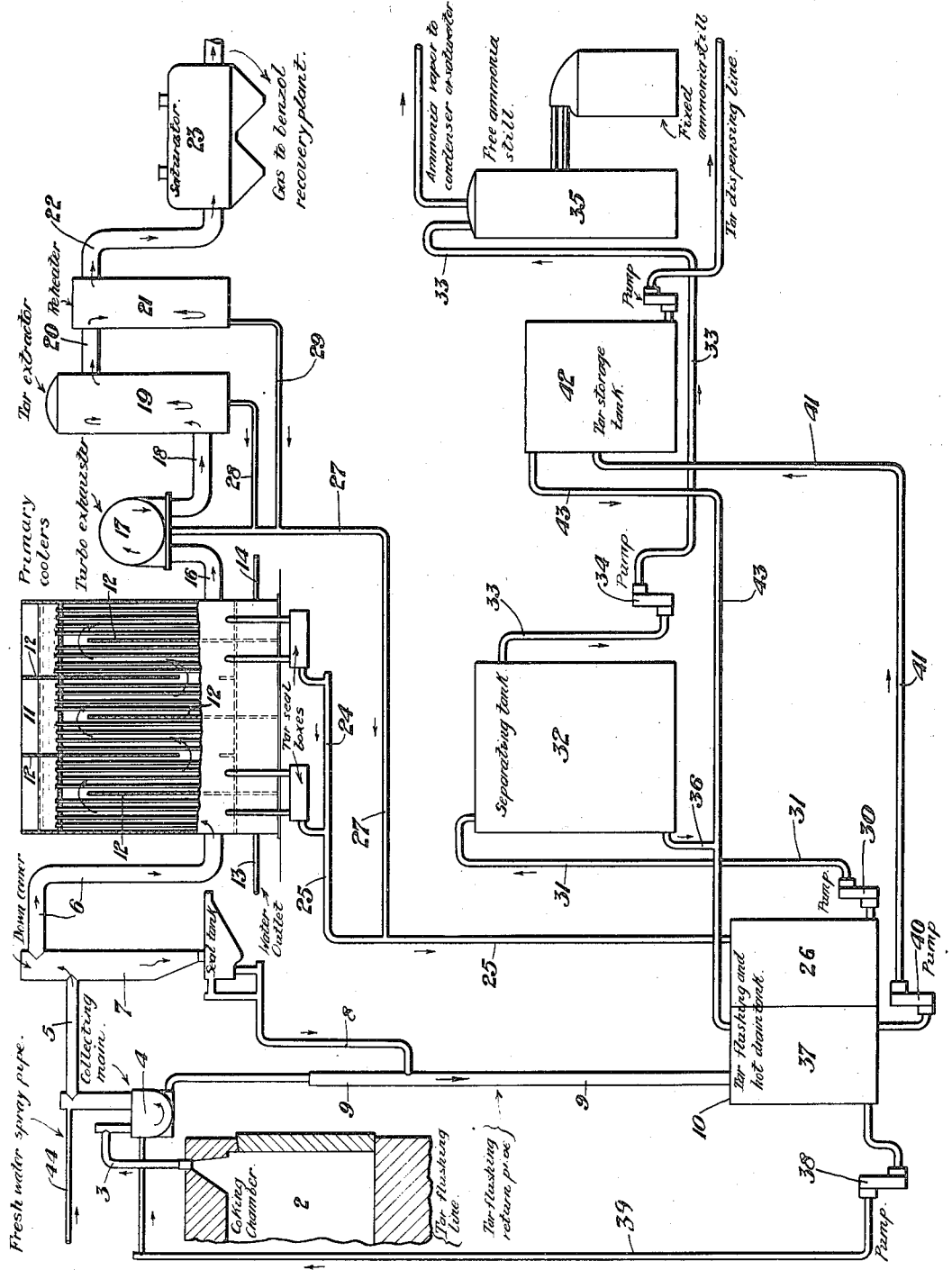
Witnesses:
Edwin Trueb
Inventor:
LEMAN E. DOTY.
by D. Anthony Usina
his Attorney.

Patented June 5, 1923.

1,457,877

UNITED STATES PATENT OFFICE.

LEMAN E. DOTY, OF ELYRIA, OHIO.

RECOVERY OF AMMONIA.

Application filed August 19, 1921. Serial No. 493,549.

*To all whom it may concern:*

Be it known that I, LEMAN E. DOTY, a citizen of the United States, and resident of Elyria, in the county of Lorain and State of Ohio, have invented certain new and useful Improvements in the Recovery of Ammonia, of which the following is a specification.

This invention relates to the production of concentrated ammonia liquor from by-product coke plants, and more particularly relates to an improved process for the production of such liquor which will materially increase the yield of such liquor, without the addition of new equipment.

Heretofore the amount of ammonia dropped out of the gases in the form of ammonia liquor has been about 25 per cent of the total ammonia recovered. Generally it is desirable to keep the total amount of ammonia dropped as liquor at as low a percentage as possible. However, due to the various conditions it is sometimes desirable to increase the percentage of ammonia dropped out as liquor, and to recover it as a concentrated liquor, and it is to this end that my invention pertains.

According to the process of this invention, the yield of ammonia in the form of liquor may be increased to about 40 per cent of the total yield.

Essentially the present process consists of eliminating the condensates coming down in the cooling process from the recirculating or flushing liquor, and distilling these condensates into a concentrated liquor as they condense, and adding fresh water or other fluid to the flushing mixture to replace the eliminated condensates. The fresh water or other fluid is preferably added to the gas by spraying it into the collecting mains, and readily absorbs additional ammonia from the gas so that about 40 per cent of the total ammonia recovered may be recovered as concentrated ammonia liquor.

The process will now be described in detail, referring to the drawing which shows diagrammatically the flow path of the gas, tar and ammonia liquor.

The distillation gas rising from the coking chambers 2 passes through ascension pipes 3 to collecting main 4, which in the usual practice, collects the gas from a battery of ovens. The gas is drawn from the collecting main 4 through suction mains 5 and 6 which are separated by a tar trap 7 to remove any condensed tar which may collect in the mains 5 and 6. The tar from the trap flows through a return pipe 8 to tar flushing return pipe 9 which connects the collecting main 4 with a tar flushing and hot drain tank 10.

From the suction main 6 the gas is drawn through a primary cooler 11 which is of well known design and consists primarily of an outer shell divided into sections by transverse walls 12 which alternately terminate short of the top and bottom walls, thereby causing the gas to flow alternately up and down through said cooler in a staggered path. Each chamber is provided with water circulation pipes to cool the gas, the water entering through inlet pipe 14 and exiting through outlet pipe 13.

During the passage through the primary cooler, the gas is so cooled that most of the tar and water vapor contained therein are condensed. From the primary cooler 11 the gas is drawn through a suction main 16 to the exhauster 17 which forwards the gas through a main 18 to a tar extractor 19 from which the gas flows through main 20 to a re-heater 21 where the last traces of tar are removed. From the re-heater 21, the tar freed and super-heated gas flows through a main 22 to the saturator 23, where the ammonia left in the gas combines with sulfuric acid to form sulfate of ammonia. The condensates from the primary cooler flow into pipe 24 which is connected to a pipe 25 leading to chamber 26 of the tar flushing and hot drain tank. The exhauster 17 is provided with a condensate outlet conduit or pipe 27 which is connected to pipe 25, and the tar extractor 19 and re-heater 21 are provided with condensate outlet conduits or pipes 28 and 29, respectively, which connect with the pipe 27 from the exhauster. It will thus be seen that all the condensates are conducted to the chamber 26 of the tank 10.

From chamber 26 of the tar flushing and hot drain tank 10 the condensates are pumped by pump 30 through pipe line 31 into a separating tank 32, where the tar and ammonia liquor are allowed to separate by specific gravity. The ammonia liquor is pumped through pipe 33 by pump 34 to the ammonia still 35 where the ammonia vapors are driven off. These vapors are then treated in a condensing plant (not shown) and converted into a concentrated liquor.

The tar from the separating tank 32 flows through pipes 36 and 43 into a compartment 37 of the tar flushing tank 10, which compartment contains the tar for flushing.

The flushing tar from compartment 37 is continually circulated by pump 38 and pipe line 39 through the collecting mains 4 to prevent the accumulation of pitch, and said flushing tar is returned from main 4 through the pipe line 9.

A pump 40 and pipe line 41 is connected to the compartment 37 of the tar flushing and hot drain tank to force the tar as it accumulates, from said compartment into the tar storage tank 42 from whence it may be dispensed, while any ammonia liquor floating on top of the tar flows back to compartment 37 of tank 10 through pipe 43.

Fresh water or other absorbing fluid is added to the gas in the gas collecting main in the form of a fine spray, through pipe 44.

It will readily be seen that instead of returning the ammonia condensates to the flushing mixture, they are taken out of the system as they condense, and distilled into a higher concentrate. The liquor thus removed is replaced by fresh water or other absorbing fluid, which is readily vaporized by the hot gas, and absorbs additional ammonia. This added fluid then condenses as ammonia liquor. It has been found that in carrying out this process in actual practice, the ammonia recovered as concentrated liquor is increased from the usual 25 per cent of the total ammonia recovered, to 40 per cent, while, of course, the yield in the form of sulfate is correspondingly reduced.

While I have shown a specific form of apparatus for carrying out my invention and have described specific detail steps of my process, I do not wish to be limited thereto, since various apparatus may be used to carry out my process, and slight modifications in the steps of the process may be made without departing from the spirit of my invention as defined in the appended claims.

I claim:—

1. The improved process for recovering ammonia liquor from by-product coke oven gas, which consists in cooling the gases to form condensates of tar and ammonia liquor, collecting said condensates, separating the tar and ammonia liquor, removing the ammonia liquor from the circulating system, recirculating the tar through the gas mains, and adding fluid to said gases prior to cooling them to absorb the ammonia in said gasses and form ammonia liquor.

2. The improved process for recovering ammonia liquor from by-product coke oven gas, which consists in cooling the gasses to form condensates of tar and ammonia liquor, collecting said condensates, separating the tar and ammonia liquor, removing the ammonia liquor from the circulating system, recirculating the tar through the gas mains, and spraying fresh water into said gases prior to cooling them to absorb the ammonia in said gas and form ammonia liquor.

3. The improved process for recovering concentrated ammonia liquor from by-product coke oven gas, which consists in collecting said gas from a plurality of ovens in a collecting main, cooling said gas to form condensates composed of tar and ammonia liquor, collecting said condensates, separating said tar and ammonia liquor, passing said ammonia liquor to a suitable still, recirculating said tar through said collecting main, spraying fresh water into said collecting main to absorb the ammonia in said gas and form ammonia liquor, and distilling the ammonia liquor in said still to form a concentrated liquor.

4. The improved process for recovering concentrated ammonia liquor from by-product coke oven gas, which consists in collecting said gas from a plurality of ovens in a collecting main, cooling said gas to form condensates composed of tar and ammonia liquor, separating said tar and ammonia liquor, passing said ammonia liquor to a suitable still, recirculating said tar through said collecting main, and spraying fresh water into said collecting main to absorb the ammonia in said gas and form ammonia liquor.

5. The improved process for recovering concentrated ammonia liquor from by-product coke oven gas, which includes as steps thereof spraying fresh water into the gas to absorb the ammonia content thereof and form ammonia liquor when the gas is cooled, cooling the gas to form a condensate of tar and ammonia liquor, removing the ammonia liquor from the system and distilling it to form a concentrated liquor, and recirculating said separated tar.

In testimony whereof, I have hereunto set my hand.

LEMAN E. DOTY.